March 1, 1955

M. C. GILL ET AL 2,703,313

CATION EXCHANGE APPARATUS

Filed Jan. 9, 1950

INVENTOR.
MERWYN C. GILL
JACK F. SELF
BY

D. Gordon Angus
ATTORNEY

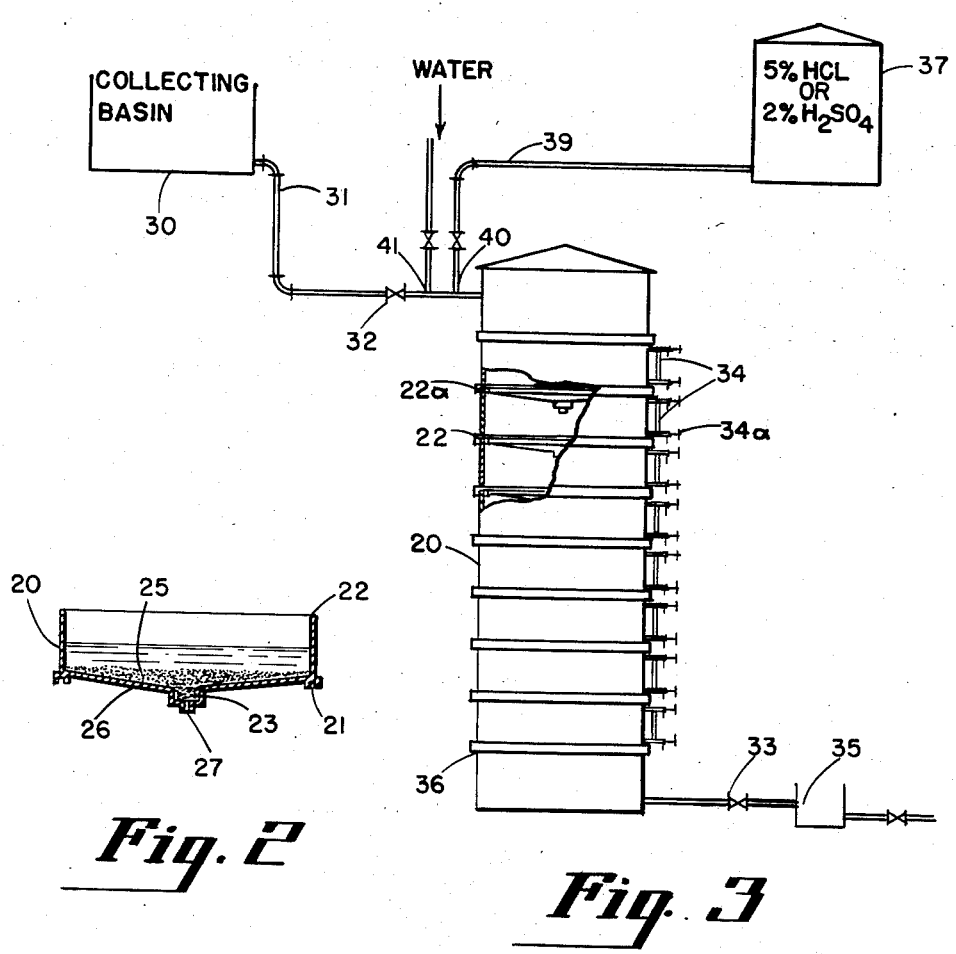

United States Patent Office 2,703,313
Patented Mar. 1, 1955

2,703,313

CATION EXCHANGE APPARATUS

Merwyn C. Gill, Los Angeles, and Jack F. Self, Monrovia, Calif., assignors, by mesne assignments, to Aerojet-General Corporation, Cincinnati, Ohio, a corporation of Ohio Application January 9, 1950, Serial No. 137,572

1 Claim. (Cl. 210—24)

This invention relates to the removal of cations of fluid media and in particular to the removal of cations injurious to animal life from aqueous solutions.

The principal object of this invention is to accomplish the purification of sump waters by employing fines of hitherto little or no value, produced as a by-product during the manufacture of ion exchange resins and capable of removing ionized material that can be either adsorbed or absorbed by the resin.

A related object is to provide a device which will purify large quantities of water even though contaminated with substances poisonous to animal life, such as aniline, hydrazine and similar organic materials.

The use of ion exchange resins for the removal of cations from water and other fluid media is well-known. However, large quantities of resins were heretofore required in the filters and the resin grains had to be relatively coarse in size to render them effective. This was necessitated by the large volume of water which is usually passed through the filter beds. It has heretofore been impractical to employ exchange resin fines because large beds of this material will generally become packed solidly and plug up the system, thus preventing any substantial quantity of water from passing through.

Ion exchangers have been employed for a considerable time. The first were naturally occurring sands or sulfonated peat or coal and were used principally to soften water. Examples of these materials are substances such as sulfonated coal cation exchangers called Zeo-Karb, and a processed greensand cation exchange resin called Zeo-Dur. The naturally occurring products, however, have considerable limitations and as a result a number of resinous ion exchange products have been developed synthetically which overcome the limitations of the natural product.

The majority of synthetic ion exchange resins comprise large insoluble molecules containing reactive groups which have the ability of partaking in a trade of ions. If the resin is a cation exchange resin it normally possesses acid groups as a part of the resin molecule. These may be sulfonic ($SO_2OH$); phenolic (OH), or carboxylic (COOH) constituents and have the following formulas, in which R is the resin portion of the molecule:

Other cations will replace the hydrogen of these acid groups to produce insoluble resin salts. Some commercial examples of cation exchange resins are Zeo-Rex, a phenolic cation exchange resin; Permutit Q, a styrene type synthetic cation exchanger; and Amberlite IR-120, which is a nuclear sulfonic type ion exchanger resin. In the manufacture of these resins a large number of fines which have heretofore been valueless are produced.

We have discovered that the heretofore unusable fines can be made to remove the impurities from the water just as effectively, or even more so, than a bed of coarse grains of resinous material. We have succeeded in doing this by employing these fines in an apparatus which successfully overcomes the tendency for the resin to become packed solidly and at the same time does not materially obstruct the flow of liquids through the beds.

The device we employ for this purpose is known as a cascading filtering arrangement. In this device, the resin is distributed over a large number of trays and the depth of resin in each tray is kept relatively shallow. Since the resinous layer is thin, it cannot pack up sufficiently to obstruct the flow of water appreciably. The finer particles of resin, such as are present in the fines, further expose the maximum contact surface to the aqueous solution and thus make it possible to remove quickly and completely all of the contaminating material from the water.

The invention is carried out by an arrangement of filtering or leaching beds having a sufficient surface area to permit the use of shallow layers of the resin in each tray or bed. The shallow beds permit the solution to pass through the resin fines under its own gravity head and at a substantial volume, so as to permit treatment of a large volume of water per unit time.

A feature of the invention resides in the arrangement of a plurality of leaching beds or trays placed in cascading arrangement with each other.

The foregoing and other features of the invention will be better understood from the following detailed description and the accompanying drawings, of which:

Fig. 2 is a cross section view showing one of the trays in Fig. 1;

Fig. 3 shows a cutaway view of a closed column type extractor in accordance with this invention, with the auxiliary units schematically shown.

Figure 1:
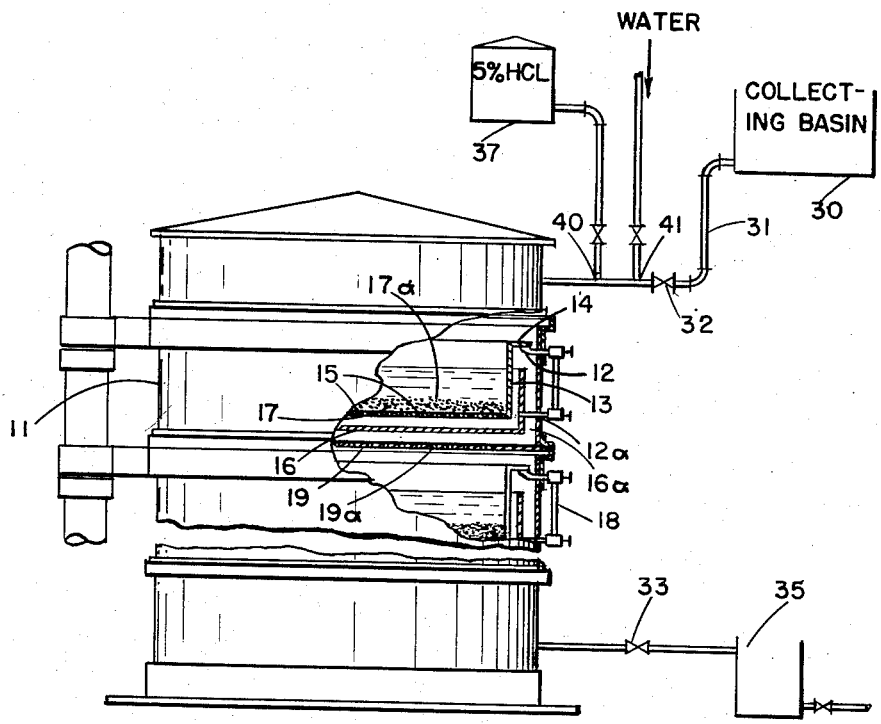
Fig. 1 shows a cutaway view of an open column type extractor in accordance with this invention, with the accompanying auxiliary units schematically indicated.

The open column type of system shown in Fig. 1 comprises a plurality of housing sections 11, preferably cylindrical in form, provided with a perforated bottom 19, which are stacked one on top of the other as indicated in the drawing. Each section 11 is provided with supporting arms 12 and 12a located at convenient intervals in the periphery of the section. The upper arms 12 support a perforated pan 13, which is of less depth than the section 11. The top of said pan 13 is provided with an annular ring 14 which will rest on arms 12. The lower surface 15 of pan 13 is provided with a plurality of holes through which the liquid passing through the fines can filter and escape into the receiving tray 16.

A corresponding receiver tray 16 which is larger in diameter than pan 13 surrounds each pan 13 and is supported by the arms 12a. The upper edge of receiver tray 16 is positioned lower than the top of filtering pan 13; therefore, water passing through the orifices 15 in the bottom of pan 13 will rise in the tray 16 until it reaches the top edge of the side and then will spill over into the space 16a between the sides of pan 16 and housing 11 onto bottom 19. Holes 19a, located near the central portion of bottom 19, permit the liquid to drain into the next lower section 11. The level of the water in the receiving tray 16 may be indicated by a sight glass 18.

The filtering pan 13 is provided with a layer 17 of glass wool, or other similar material. A layer 17a of, for example, about one and one-half inches deep of exchange resin fines is then placed over the glass wool.

The closed column type of system, shown in Fig. 3, comprises a plurality of trays 20. The sides of the trays are provided with a grooved annular slot 21 on their bottom edge, and the top edge 22 is designed to form a snug fit when fitted into the grooved slot 21. A plurality of these trays are mounted together in a stacked arrangement, as shown in Fig. 3; since the upper edge 22 and the grooves 21 of each section seal to each other, the effect is to form a continuous closed column. The column is made airtight by employing a gasket 22a between the upper edge 22 and the top of the group 21. Each tray is provided with a central drain portion 23 in which there is placed a layer of glass wool 24. A layer of fines about one and one-half inches thick is placed on the sloping bottom 26 of the tray and on top of the glass wool 24. The central portion of the drain is provided with an outlet 27 which permits the solution to pass from the upper tray into the next tray below.

The operation of the open column system, shown in Fig. 1, is as follows: Waste water is accumulated in sump 30 and conducted to the top of the column by a conduit or line 31. The flow through conduit 31 is controlled by shutoff valve 32. When the valve 32 is opened, water will flow into the top of the column and will enter a filtering pan 13 located in the first tray 11. The level of the water in filtering pan 13 will rise to a height equivalent to the level of the top of tray 16 after first passing through the resin and glass wool layers 17 and 17a, and then escaping from the filtering pan 13 through holes 15 located in the bottom. When tray 16 is filled the water will spill over the top edge of the tray through space 16a and fall on the circular bottom 19 of section 11. The level of the water in tray 16 is indicated by sight glass 18. Holes 19a located near the central portion of the bottom 19 will then allow the water to fall into the next succeeding filtering pan 13.

The operation of the closed column system, shown in Fig. 3, is as follows: A valve 32 controls the flow of water from the collecting basin into the upper tray. The filtering pans are covered with a layer of glass wool about one-half inch deep, and a layer of cation exchange resin fines, about one and one-half inches deep, is spread on top of the glass wool. A valve 33 located at the lower end of the column is then closed and the system is made airtight. Valve 32 is opened permitting the water to flow into the column until the water reaches the level of approximately 2 to 3 inches in each of the sight glasses 34, which are located on the outside of the column at the level of each tray. If necessary, air may be bled from the system in any one tray by opening stop cock 34a at the top of the proper sight glass until the water has reached its proper level, then all openings are closed and the valve 33 may be opened permitting the purified water from the last tray to escape into the reservoir 35, or other reservoir.

During the passage of the water through the trays, the ionized materials or materials capable of being adsorbed or absorbed are acted upon by the ion exchange resin which removes them from the solution, in accordance with the principle of ion exchange reactions well understood in the art. The different cells, particularly the upper ones, should be sampled at convenient intervals, usually once a day. As soon as the water passing through any one tray shows no change in the content of the ionized material, from the time it entered the tray until it leaves the tray, it is to be assumed that the resin's capacity has been exhausted. The spent tray can be removed from the system and a new tray placed at the end of the column 36. The resin in the spent tray is removed and may be burned, or recovered as desired.

Since the resin fines must ordinarily be in the hydrogen cycle before they are effective in removing cations, and since these fines are generally shipped in the sodium cycle, it may be desirable or necessary that the resin be activated before placing the column in use, or before placing a new tray in the system. This can be done by passing a 2% sulfuric acid or a 5% hydrochloric acid solution through the resin. Such acid can be stored in a suitable container 37, which may be fed to the top of the column by line or conduit 39, intersecting line 31 at a point 40 just prior to the point where line 31 enters the top of the column. The acid percolating through the resin fines places them in the hydrogen cycle and activates the resins. The excess acid can then be removed from the column or tray by rinsing the system with fresh water until the aqueous solution leaving the bottom of the column is neutral to thymol blue indicator. The rinse water is preferably introduced into line 31 at a point 41 upstream of the point 40 where the acid enters. The regeneration of the resin and insertion of new trays may be done at any convenient time when the column is not being used to purify waste waters.

Figure 4:
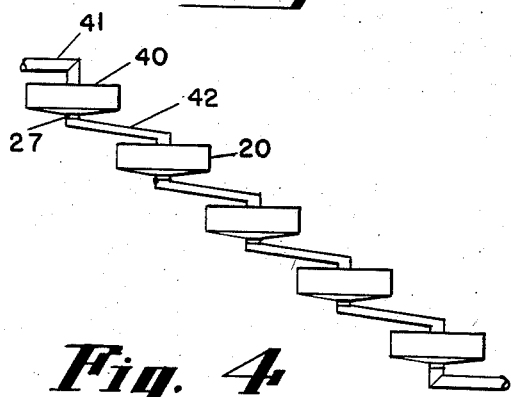
Fig. 4 is a schematic view showing another cascading arrangement using a plurality of filtering traps separated from each other.

Another arrangement is shown schematically in Fig. 4. In this arrangement a plurality of trays, preferably trays similar to the tray used in the closed type column, are provided with a closed top 40 into which there is inserted a pipe or conduit 41. A drain line 42 leads the water that has percolated through the fines from the outlet 27 to the next tray. This arrangement could be employed on a hillside arrangement.

The arrangements shown in Figs. 1, 3 and 4 all operate through gravity flow of water. However, it is intended to also include arrangements of the cells in which the water does not pass from cell to cell by gravity flow and flow of the water through the cells is obtained by placing the water under pressure by pumping it.

It will be recognized that by this invention there is provided means for recovering or rendering harmless waste waters which normally contain ionic substances particularly those substances injurious to animal or vegetable life. The invention is particularly useful in localities where limited water supplies may become contaminated by surface operations which dispose ionic materials by dumping them on the ground where they are absorbed by the soil. A particular location where this practice presents a problem is in the desert where the principal water supply comes from underground sources which are of limited capacity. In such situations, the discarded poisonous materials dumped on the ground, will be rapidly absorbed by the ground and would soon contaminate the limited water supplies and render them unusable.

A further advantage is in the fact that the cost of purifying the water by our method is negligible and makes it economical to recover waste water containing ionized materials capable of being adsorbed or absorbed before it is returned to the ground.

A related advantage of our invention is that the material used in removing the cations can be obtained for a fraction of the cost of the coarser commercial grades of exchange resins. Therefore, when a resinous bed becomes exhausted the entire resinous mass in the tray and extracted contaminant can be burned, or otherwise disposed of, thus permanently destroying the contaminant. In the event that the material removed from the water solution is of value, and is present in sufficient quantities to warrant recovery, the ionic substance may be recovered by regenerating the resins in the manner in which the conventional ion exchange resins are regenerated. In the majority of instances, however, the materials removed from the water are of little or no value and can be destroyed.

A sufficient number of trays to insure the complete removal of the undesirable cation from the water solution can easily be employed. Furthermore, progress in the removal of the contaminating ions may be followed closely by periodic examination of the water discharged from each tray. Whenever the cation count of the water entering a tray and passing through a tray shows no change, that is a warning to the operator that the resin in the tray has been exhausted. When this occurs the offending tray, which is usually the top one, can be removed and another tray containing fresh resin fines can be introduced, preferably at the end of the system. In this manner, it is possible to keep the system operating with a maximum efficiency and volume at all times.

We claim:

A closed ion exchange system comprising a column of a plurality of trays assembled one over another in stacked arrangement, each of said trays having a bottom member and a side member, the side member having interlocking means at its upper and lower edges, said interlocking means comprising a groove formed at the lower edge of each of the trays which has a tray below it, each of said grooves receiving the upper rim of the side of the tray below it, the bottom member of each tray slanting downwardly from the side member to a centrally located lowermost position, a drain chamber beneath the bottom member at said lowermost position, said drain chamber containing a layer of glass wool, and a layer of cation active resin fines over the glass wool and on the bottom member in each tray, a drain outlet from said chamber communicating with the tray below, a cover over the uppermost tray, an entrance into the uppermost tray, and an outlet from the lowermost tray.

References Cited in the file of this patent

UNITED STATES PATENTS

| Number | Name | Date |
|---|---|---|
| 174,532 | Hulbert | Mar. 7, 1876 |
| 305,953 | Neiman | Sept. 30, 1884 |
| 1,657,822 | Frechou | Jan. 31, 1928 |
| 1,730,581 | McMachen et al. | Oct. 8, 1929 |
| 1,951,917 | Leslie | Mar. 20, 1934 |
| 2,522,569 | Day et al. | Sept. 29, 1950 |

FOREIGN PATENTS

| Number | Country | Date |
|---|---|---|
| 211,064 | Germany | June 24, 1909 |
| 805,092 | France | Aug. 17, 1936 |